United States Patent
Moreman et al.

(10) Patent No.: US 12,133,165 B2
(45) Date of Patent: *Oct. 29, 2024

(54) DETERMINING LOCATIONS FOR RANGE-EXTENDING DEVICES

(71) Applicant: Comcast Cable Communications, LLC, Philadelphia, PA (US)

(72) Inventors: Charles Stephens Moreman, Philadelphia, PA (US); Jon Cave, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,583

(22) Filed: May 16, 2022

(65) Prior Publication Data
US 2023/0116649 A1   Apr. 13, 2023

Related U.S. Application Data

(63) Continuation of application No. 16/864,576, filed on May 1, 2020, now Pat. No. 11,375,449.

(51) Int. Cl.
*H04W 48/20* (2009.01)
*H04B 7/155* (2006.01)
(Continued)

(52) U.S. Cl.
CPC ........ *H04W 48/20* (2013.01); *H04B 7/15507* (2013.01); *H04B 17/318* (2015.01);
(Continued)

(58) Field of Classification Search
CPC ..... H04W 48/20; H04W 24/02; H04W 16/26; H04B 7/15507
See application file for complete search history.

(56) References Cited

U.S. PATENT DOCUMENTS 10,735,949 B1 *  8/2020  Reeves ................ H04W 8/245
2016/0302079 A1  10/2016  Chari et al.
(Continued)

FOREIGN PATENT DOCUMENTS

EP       3493578 A1       6/2019
WO   WO-2019020527 A1 *  1/2019  ............ H04W 88/04

OTHER PUBLICATIONS

Netgear, Create whole home WiFi with Nighthawk Mesh Extender, retrieved on Jan. 27, 2020, https://www.netgear.com/landings/mesh-wifi-extenders/.

(Continued)

*Primary Examiner* — Jamal Javaid
*Assistant Examiner* — Ryan C Kavleski
(74) *Attorney, Agent, or Firm* — Banner & Witcoff, Ltd.

(57) ABSTRACT

Systems, apparatuses, and methods are described for determining locations for range-extending devices. Signal strength between devices within an area may be measured one or more times over a time period. Based on the measurements, signal loss over fronthaul links and backhaul links may be determined for each range-extending device in the area. A predicted improvement in signal quality may be determined. A direction and distance to move each range-extending device may be determined based on a comparison with the fronthaul and backhaul signal qualities and the predicted improvement in signal quality. The direction, improvement in signal quality, and/or user preferences for devices may be used to determine an improvement associated with moving one or more range-extending devices.

32 Claims, 10 Drawing Sheets

(51) Int. Cl.
*H04B 17/318* (2015.01)
*H04W 16/26* (2009.01)
*H04W 24/02* (2009.01)
*H04W 88/08* (2009.01)

(52) U.S. Cl.
CPC ........... *H04W 16/26* (2013.01); *H04W 24/02* (2013.01); *H04W 88/08* (2013.01)

(56) References Cited

U.S. PATENT DOCUMENTS

| | | |
|---|---|---|
| 2017/0353245 A1 | 12/2017 | Vardarajan et al. |
| 2019/0319868 A1* | 10/2019 | Svennebring ......... H04L 41/147 |
| 2021/0021998 A1* | 1/2021 | Chari .................... H04W 12/37 |
| 2021/0235293 A1 | 7/2021 | Chen et al. |

OTHER PUBLICATIONS

Actiontec, WiFi Extenders Beat WiFi Repeaters Every Time, retrieved Jan. 24, 2020, https://www.actiontec.com/wifihelp/wifibooster/wifi-extenders-beat-wifi-repeater-every-time/.

Xfinity, xFi Pods Frequently Asked Questions, retrieved Jan. 24, 2020, https://www.xfinityt.com/support/articles/xfi-pods-faqs.

* cited by examiner

| Account Number | Report Date-Time | Sample Start Time | Sample End Time | Total Benefit Score | Number of Devices |
|---|---|---|---|---|---|
| 123456 | 02.25.2019 15:39 | 02.22.2019 12:00 | 02.24.2019 12:00 | 85 | 3 |

| Device 1 ID | Benefit Score | Move Direction | Move Distance |
|---|---|---|---|
| 23:42:54:12:34:56 | 45 | Toward gateway 12:34:56:34:78:90 | 20 Feet |

| Device 2 ID | Benefit Score | Move Direction | Move Distance |
|---|---|---|---|
| 23:42:54:12:34:78 | 20 | Away from gateway 12:34:56:34:78:90 and towards device 09:34:34:78:85:94 | 10 Feet |

| Device 3 ID | Benefit Score | Move Direction | Move Distance |
|---|---|---|---|
| 23:42:54:12:34:89 | 20 | Away from gateway 12:34:56:34:78:90 and towards device 56:94:12:34:87:12 | 10 Feet |

FIG. 7

DETERMINING LOCATIONS FOR RANGE-EXTENDING DEVICES

CROSS-REFERENCE TO RELATED APPLICATIONS

This application is a continuation of and claims priority to U.S. application Ser. No. 16/864,576, filed May 1, 2020, which is incorporated herein by reference in its entirety.

BACKGROUND

Range-extending devices may be deployed in various locations to assist in providing connectivity between one or more wireless devices within an area. A range-extending device may increase the range of a wireless network and may improve connectivity by serving as an intermediary between wireless devices and sending data back and forth between such wireless devices. It may be difficult, however, to determine where a range-extending device should be placed to maximize connectivity among wireless devices in a given area.

SUMMARY

The following summary presents a simplified summary of certain features. The summary is not an extensive overview and is not intended to identify key or critical elements.

Systems, apparatuses, and methods are described for determining locations for range-extending devices to improve signal quality between wireless devices in an area. The wireless device may comprise, for example, one or more access points, one or more range-extending devices, one or more client devices, and/or one or more other types of computing devices. Signal quality between wireless devices within an area may be measured one or more times during a time period. Based on the measurements, signal quality over fronthaul connections and backhaul connections may be determined for each range-extending device in the area. Based on determined signal qualities, predicted improvements in signal quality may be determined. A direction and distance to move each range-extending device may be determined based on a comparison with the fronthaul and backhaul signal qualities and the predicted improvement in signal quality. The direction, improvement in signal quality, and/or user preferences for devices may be used to determine a benefit score for moving one or more range-extending devices. A user or technician associated with the monitored area may receive a recommendation to move one or more range-extending devices if the benefit score exceeds a threshold.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7 shows an example recommendation for moving rang-extending devices.

DETAILED DESCRIPTION

Figure 1:
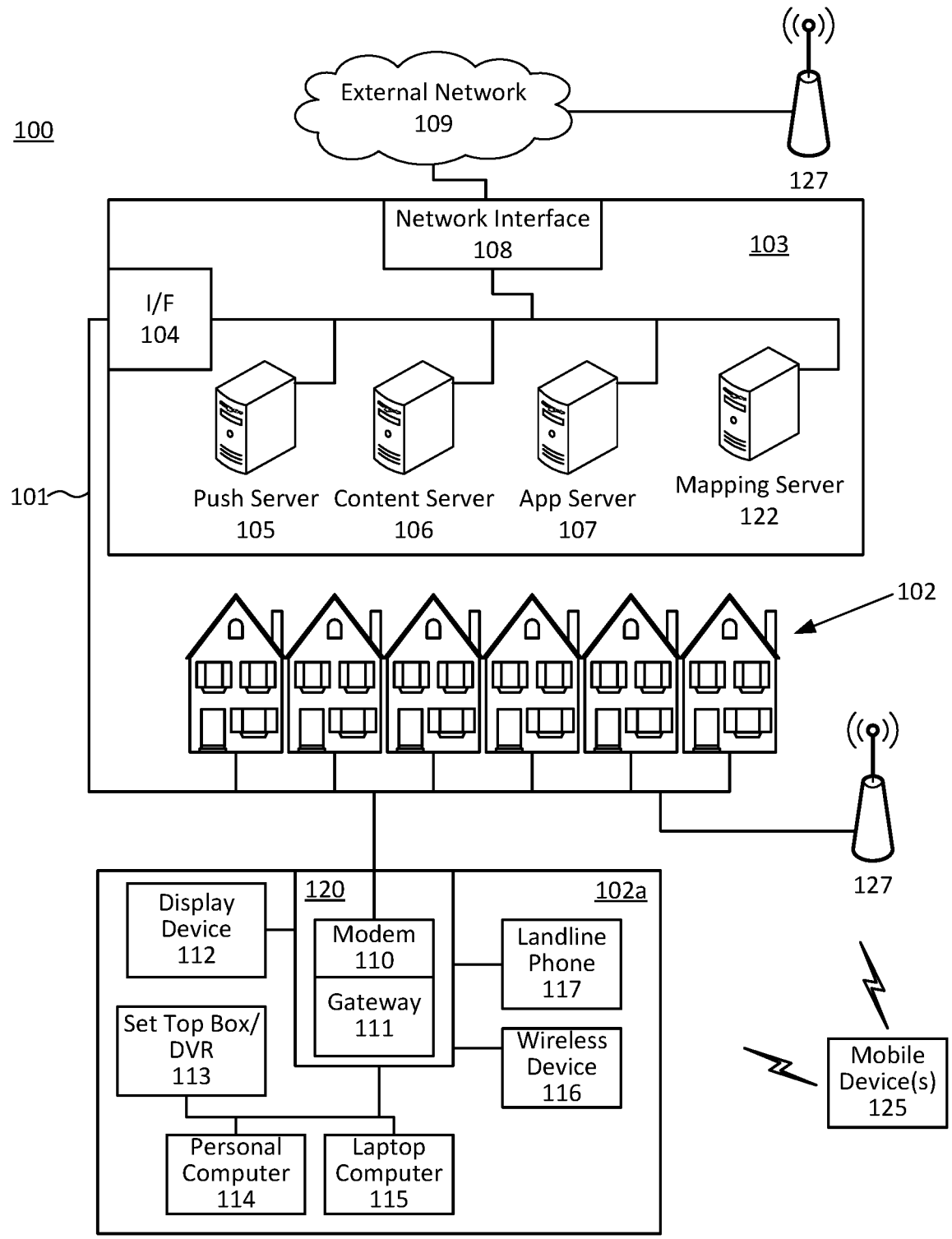
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the mapping server 122 (described below), additional push, content, and/or application servers, and/or other types of servers. Although shown separately, the push server 105, the content server 106, the application server 107, the mapping server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
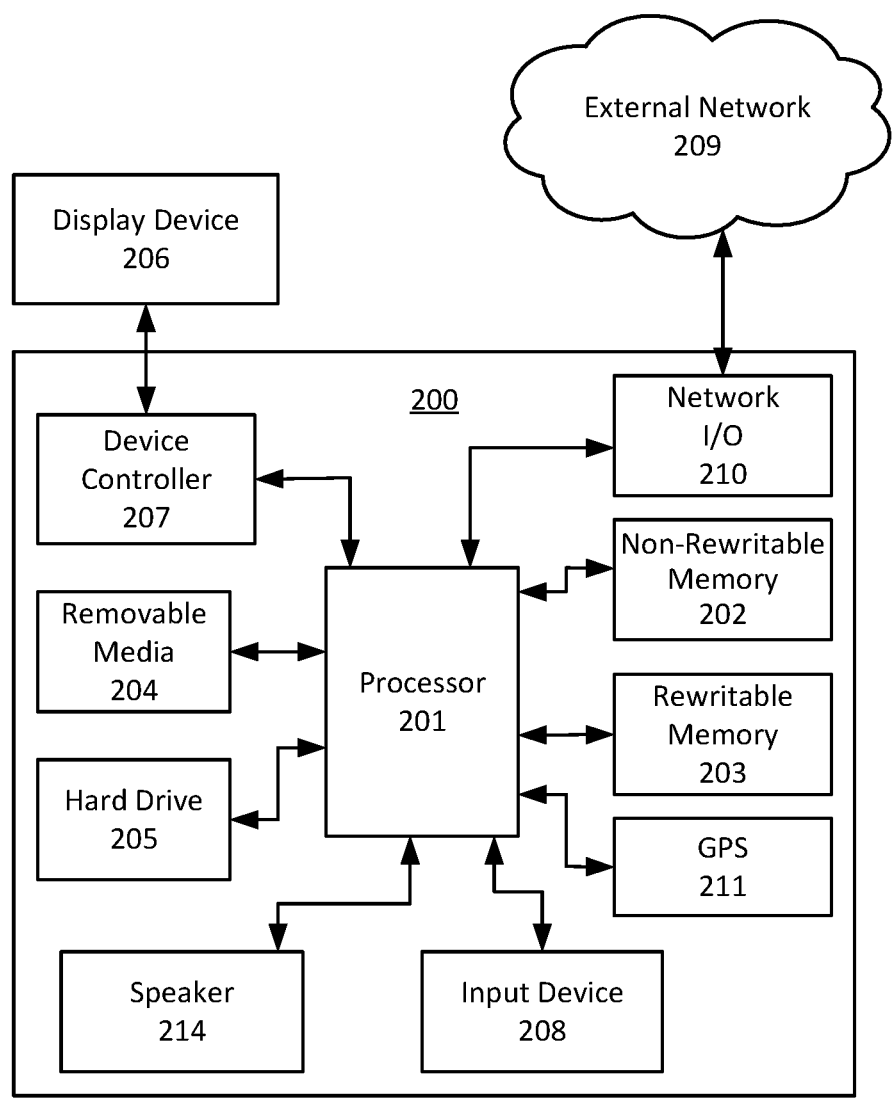
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the mapping server 122, the access points 305 or 405, any range-extending device (e.g., the range-extending device 310, 410, 412, 414, 416), or any user device discussed in connection with FIGS. 3-6). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIGS. 3A-3D show example layout possibilities of an access point 305, a range-extending device 310, and a client device 315. The access point 305 may have a wireless range 306, and the range-extending device 310 may have a wireless range 311. Here and in the description below for FIGS. 3-7, wireless communications between an access point and a range-extending device, between two range-extending devices, and/or between a range-extending device and a client device may comprise communication via WiFi links, Bluetooth links, 5G NR links, 4G LTE links, satellite links, Mobile Telephone System links, and/or any other type of radio communication link. The wireless ranges 306 and 311 may be associated with a threshold connection speed (e.g., bandwidth, throughput, latency, etc.) and/or a threshold connection reliability (e.g. packet loss, packet retries and intermittent connections). Range-extending devices or client devices within range 306 may be able to communicate with the access point 305 at or above the threshold connection speed and/or at or above the threshold connection reliability. Range-extending devices or client devices within range 311 may be able to communicate with the range-extending device 310 at or above the threshold connection speed and/or at or above the threshold connection reliability. Range-extending devices or client devices outside of the wireless ranges 306 and 311 may be able to communicate with the access point 305 and range-extending device 310 at a speed (e.g., bandwidth, throughput, latency, etc.) that is below the threshold connection speed and/or may be able to communicate with the access point 305 and range-extending device 310 at a connection reliability that is below the threshold connection reliability. Signal quality between wireless devices may indicate a connection speed and/or connection reliability. The access point 305 and/or range-extending device 310 may measure signal quality as discussed below in step 612 of FIG. 6.

The ranges 306 and 311 may be associated with different levels of connection speeds and/or connection reliability. For example, the areas within the ranges 306 and 311 may be considered optimal and areas outside the ranges may be considered suboptimal (e.g., devices communicating with the access point 305 and/or the range-extending device 306 may have slower speeds and/or lower reliability if they are located outside ranges 306 or 311). The access point 305 and the range-extending device 310 may use a fronthaul link to communicate with the client device 315. Communications between the access point 305 and the range-extending device 310 may use a backhaul link.

The access point 305 may comprise a wireless computing device such as the gateway 111, set top box/DVR 113, the personal computer 114, the laptop computer 115, the wireless device 116, and/or the mobile device 125. The access point 305 may comprise a hub or node of a wireless network and/or may control access (e.g., allow connection) to a wireless network. The access point 305 may provide access to other networks (e.g., the Internet). The client device 315 may comprise a wireless computing device such as the wireless device 116, the laptop computer 115, the personal computer 114, the set top box/DVR 113, or the mobile device 125. The client device 315 may comprise a wireless computing device such as a personal digital assistant, voice recognition assistant, tablet computer, desktop computer, smart home device, infotainment head unit of a vehicle, or any other type of device. The client device 315 may comprise a wireless computing device such as any type of Internet of Things (IoT) device (e.g., electrical outlet, kitchen appliance, light bulb, thermostat control, etc.).

The range-extending device 310 may comprise any type of wireless computing device that can be used to receive (e.g., via a direct wireless link with the access point 305 or via a direct wireless link with another range-extending device) information from the access point 305 and send (e.g., via a direct wireless link with the client device 315 or via a direct wireless link with another range-extending device) that information to the client device 315, and/or to receive (e.g., via a direct wireless link with the client device 315 or via a direct wireless link with another range-extending device) information from the client device 315 and send (e.g., via a direct wireless link with the access point 305 or via a direct wireless link with another range-extending device) that information to the access point 305. For example, the range-extending device 310 may comprise a wireless network range extender, a range booster, a mesh extender, and/or an extender pod. The range-extending device 310 may be specifically designed to relay communications between an access point and one or more client devices and/or extend a range of a wireless network. Also or alternatively, the range-extending device 310 may comprise the personal computer 114, the laptop computer 115, wireless device 116, or the mobile device 125, a router, or another computing device that has been configured to, in addition to performing other operations, relay communications between an access point and one or more client devices and/or extend a range of a wireless network. The access point 305 and the range-extending device 310 may comprise the same type of wireless device or different devices. The range-extending device 310 may receive data from the access point 305 and may send or forward the data to the client device 315 or a different range-extending device. The range-extending device 310 may receive data from the client device 315 and may send or forward the data to the access point 305 or a different range-extending device. The range-extending device 310 may receive data from the access point 305 and may send data to the access point 305 via backhaul wireless communications. The range-extending device 310 may receive data from the client device 315 and send data to the client device 315 via fronthaul wireless communications. Fronthaul and backhaul wireless communications may comprise separate connections, links, and/or channels. When communicating via a fronthaul or backhaul connection or link, the range-extending device 310 may communicate indirectly with the access point 305 or the client device 315 (e.g., there could be other range-extending computing device(s) in the fronthaul or backhaul links). For example, there may comprise multiple range-extending devices between the access point 305 and the client device 315. The range-extending device 310 may send data from the access point 305 to another range-extending device to allow data to travel from the access point 305 to the client device 315 (or vice versa, from the client device 315 to the access point 305).

The client device 315 may act as a range-extending device and may relay information between each of one or more wireless devices and the access point 305 or the range-extending device 306. For example, the client device 315 may comprise a smartphone that uses 5G New Radio (NR) to connect with other devices and relay information between a cellular access point and the other devices.

Figure 3A:
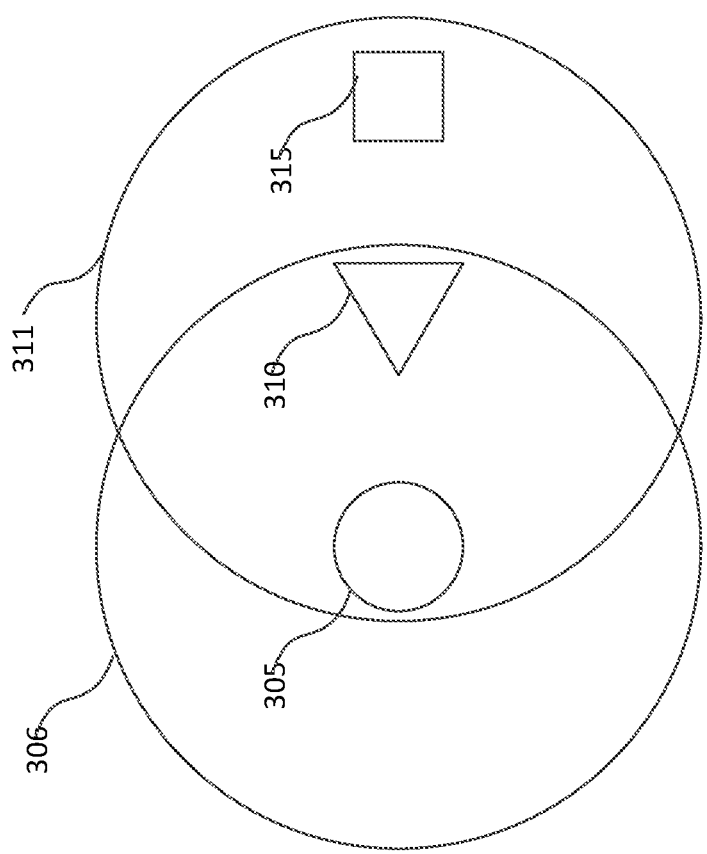
FIGS. 3A-3D show example range-extending device layouts.

FIG. 3A shows an example layout of devices where a change in the layout may be unnecessary. In the example layout shown in FIG. 3A the access point 305 and range-extending device 310 are within range of each other because the access point 305 is within the range 311 and the range-extending device 310 is within the range 306. No change to the layout in FIG. 3A may be necessary because the devices are within range of each other (e.g., the range-extending device 310 is able to, at an optimal speed and/or reliability, receive from and send information to and from the access point 305 and the client device 315). When the devices (e.g., the range-extending device 310, the access point 305, and/or the client device 315) are within range of each other, moving the range-extending device 310 closer to the access point 305 and/or to the client device 310 may improve signal quality, but there may be no improvement in connection quality (e.g., the devices may already have the maximum connection quality possible for the devices or data subscription type). Also alternatively, moving the range-extending device 310 closer to one of the access point 305 or the client device 310 could potentially move the range-extending device 310 farther from the other of the access point 305 or the client device 310, thereby moving the range-extending device outside of the range 306 or moving the client device outside of the range 311.

Figure 3B:
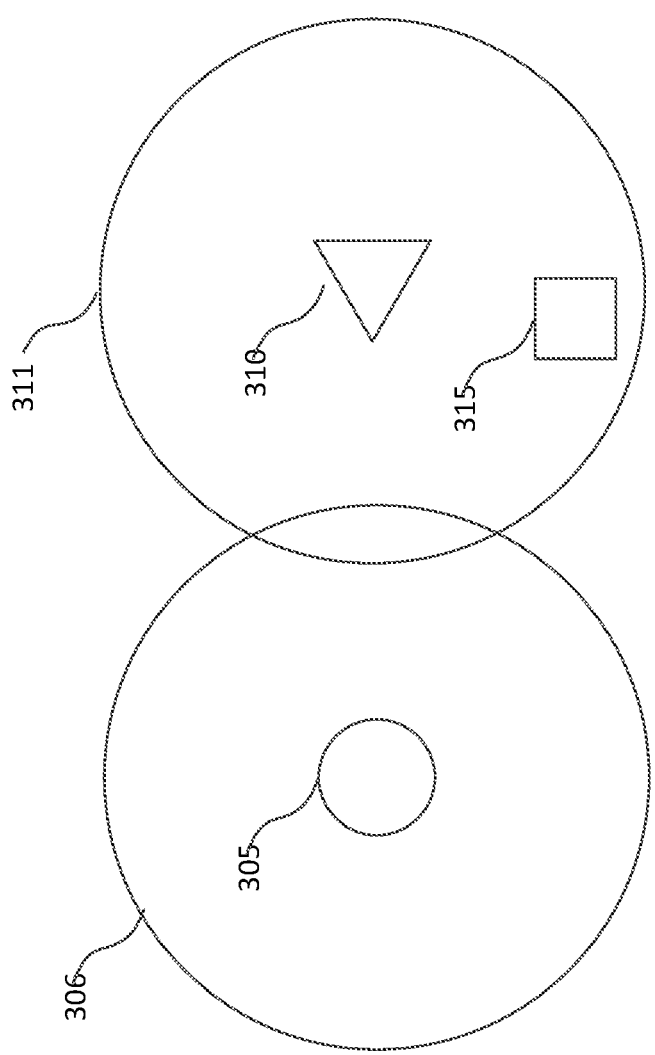
Figure 3C:
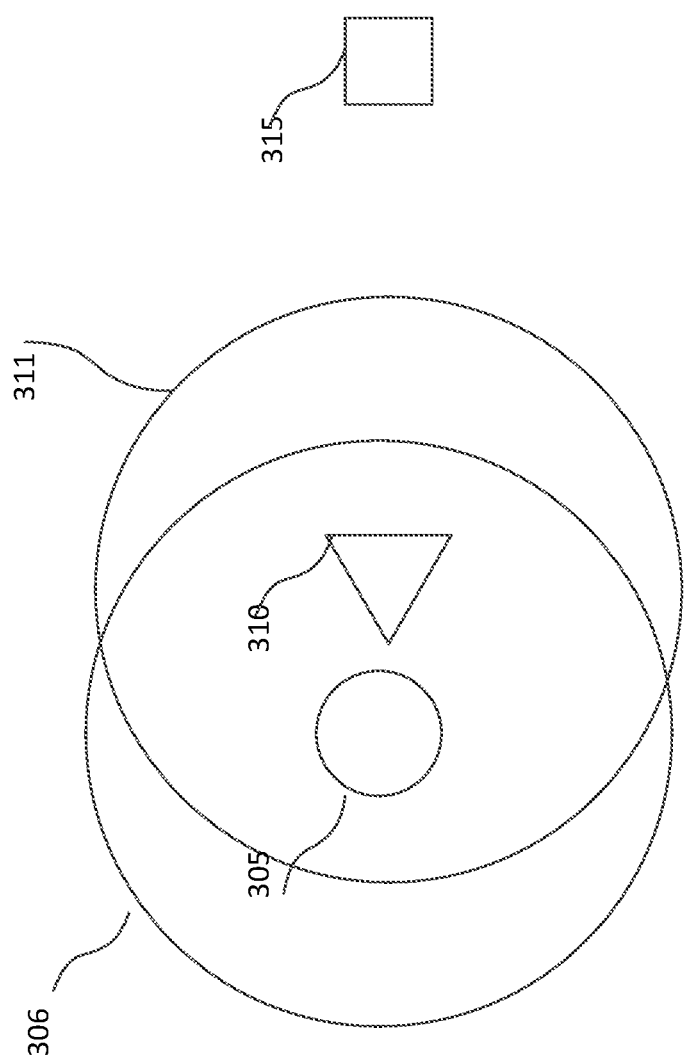
Figure 3D:
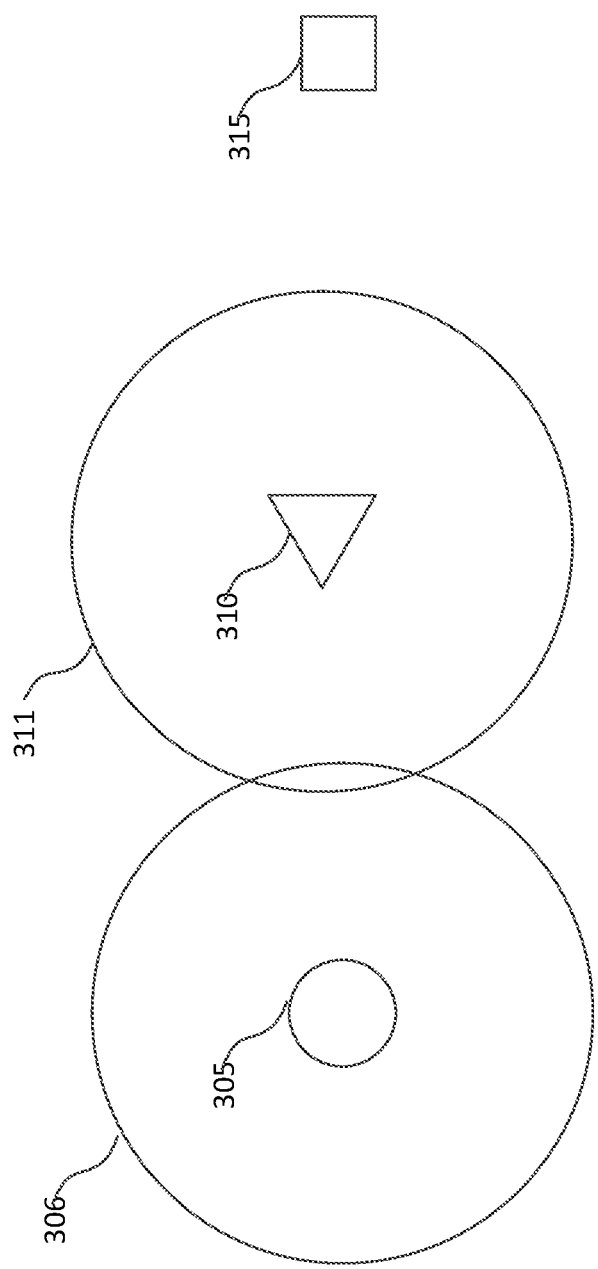

FIGS. 3B-3D show example layouts that may need to be changed to improve connectivity between devices. In FIG. 3B, the access point 305 and the range-extending device 310 may be unable to send each other information (e.g., because the range of access point 305 does not cover device 310), or may send information to each other below a threshold connection speed and/or reliability. Signal quality for devices in FIG. 3B may be improved by moving the range-extending device 310 closer to the access point 305. In FIG. 3C, the access point 305 and the range-extending device 310 are within range of each other but the client device 315 is out of range of the range-extending device 310. Signal quality for devices in FIG. 3C may be improved by moving the range-extending device 310 closer to the client device 315 so that the client device 315 is within range of the range-extending device 310. In FIG. 3D, the access point 305 and range-extending device 310 may have difficulty communicating because they are out of range with each other. The range-extending device 310 may also have difficulty communicating with the client device 315. In FIG. 3D, moving the range-extending device 310 closer to the access point 305 may improve signal quality for the connection between the access point 305 and the range-extending device 310, but may decrease signal quality of the connection between the range-extending device 310 and the client device 315. Moving the range-extending device 310 closer to the client device 315 may improve signal quality for the connection between the range-extending device 310 and the client device 315, but may decrease signal quality for the connection between the range-extending device 310 and the access point 305. A range-extending device may be added between the range-extending device 310 and the client device 315 to enable the range-extending device 310 and the client device 315 to communicate. Data from the client device 315 may need to be relayed using two range-extending devices to reach the access point 305.

Figure 4:
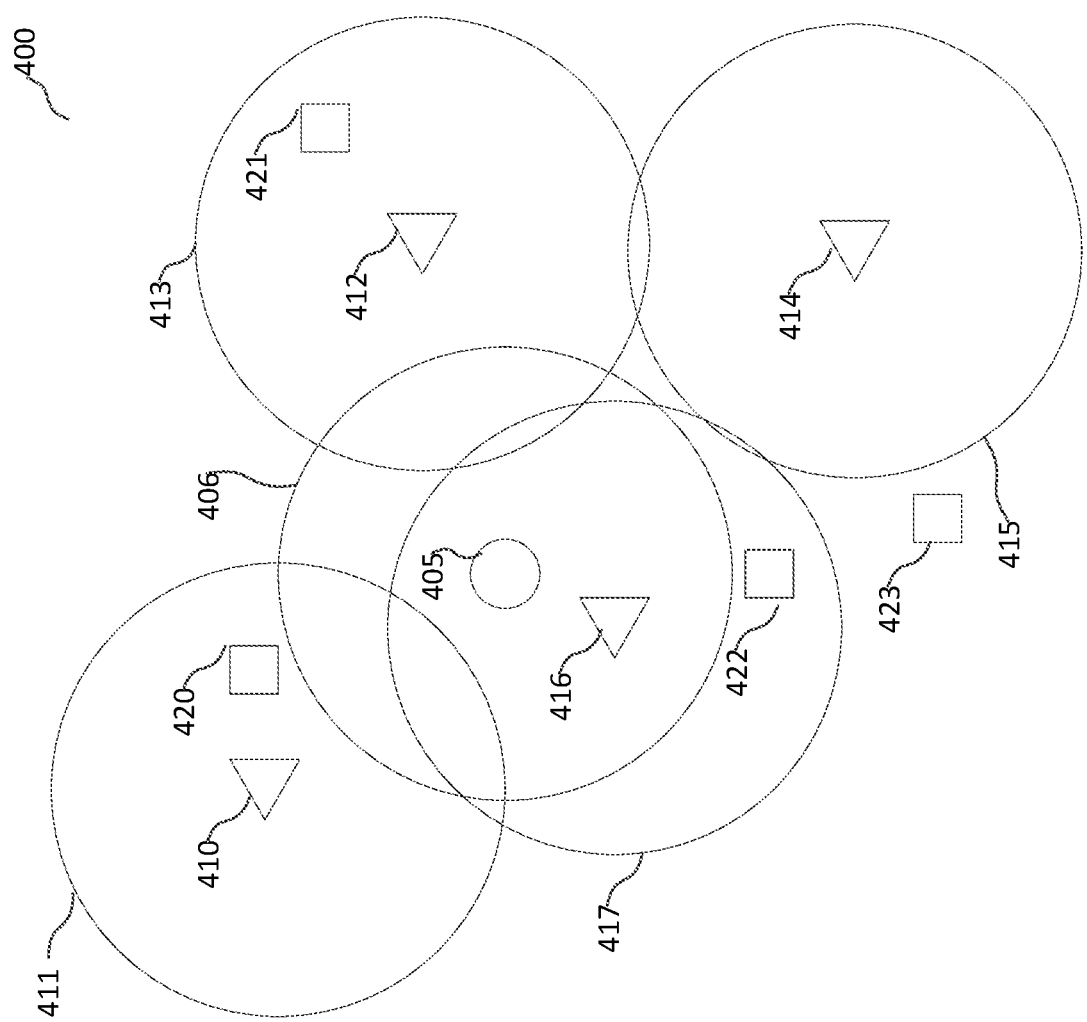
FIG. 4 shows an example range-extending device layout.

FIG. 4 shows an example area 400 that comprises an access point 405 with range 406, multiple range-extending device devices (e.g., range-extending device 410 with range 411, range-extending device 412 with range 413, range-extending device 414 with range 415, and range-extending device 416 with range 417), and client devices (e.g., client devices 420, 421, 422, 423). The range-extending devices, access point, and client devices may be the same or similar to the range-extending device, access point, and client device discussed in connection with FIGS. 3A-3D. The area 400 may comprise one or more buildings, one or more rooms within a building or house, one or more neighborhoods, etc. Although a limited number of devices are depicted in FIG. 4, the area 400 may comprise any number of range-extending devices, access points, and client devices. There may be multiple link combinations between each of one or more range-extending devices and client devices. Client devices and/or range-extending devices within the area 400 may connect to one or more other client devices, range-extending devices, or access points. Backhaul links may connect from one range-extending device to another until an access point is reached. For example, the range-extending device 414 may send information from the client device 423 to the range-extending device 416, and the range-extending device 416 may send the information to the access point 405. Client devices may connect directly to an access point or a range-extending device. For example, client device 420 may connect directly to access point 405, or it may connect to the range-extending device 410 (e.g., to obtain access to the Internet and/or another network). Signal strength may vary over time as client devices are moved and as objects move and impair or improve signal. Fronthaul links may change as devices connect to different range-extending devices or access points. Backhaul links may change as range-extending devices are moved within the area 400.

For example, the access point 405 may connect to the range-extending device 416 and the range-extending device 416 may connect to the range-extending device 414. The range-extending device 414 may also connect to the client device 423. The wireless link from the access point 405 to the range-extending device 416 may be considered a backhaul link. The wireless link between the range-extending device 414 and the client device 423 may be considered a fronthaul link. For devices such as range-extending device 416 (e.g., where two range extending devices are connected to each other), the range-extending device 416 may determine links via which communications are coming to the range-extending device 416 from the access point 405, or going from the range-extending device 416 to the access point 405, and treat those links as backhaul links. The range-extending device 416 may determine links via which communications are coming to the range-extending device 416 (e.g., via the range-extending device 414) from the client device 423 or going from the range-extending 416 device to the client device 423 (e.g., via the range-extending device 414), and treat those links as fronthaul links.

Figure 5:
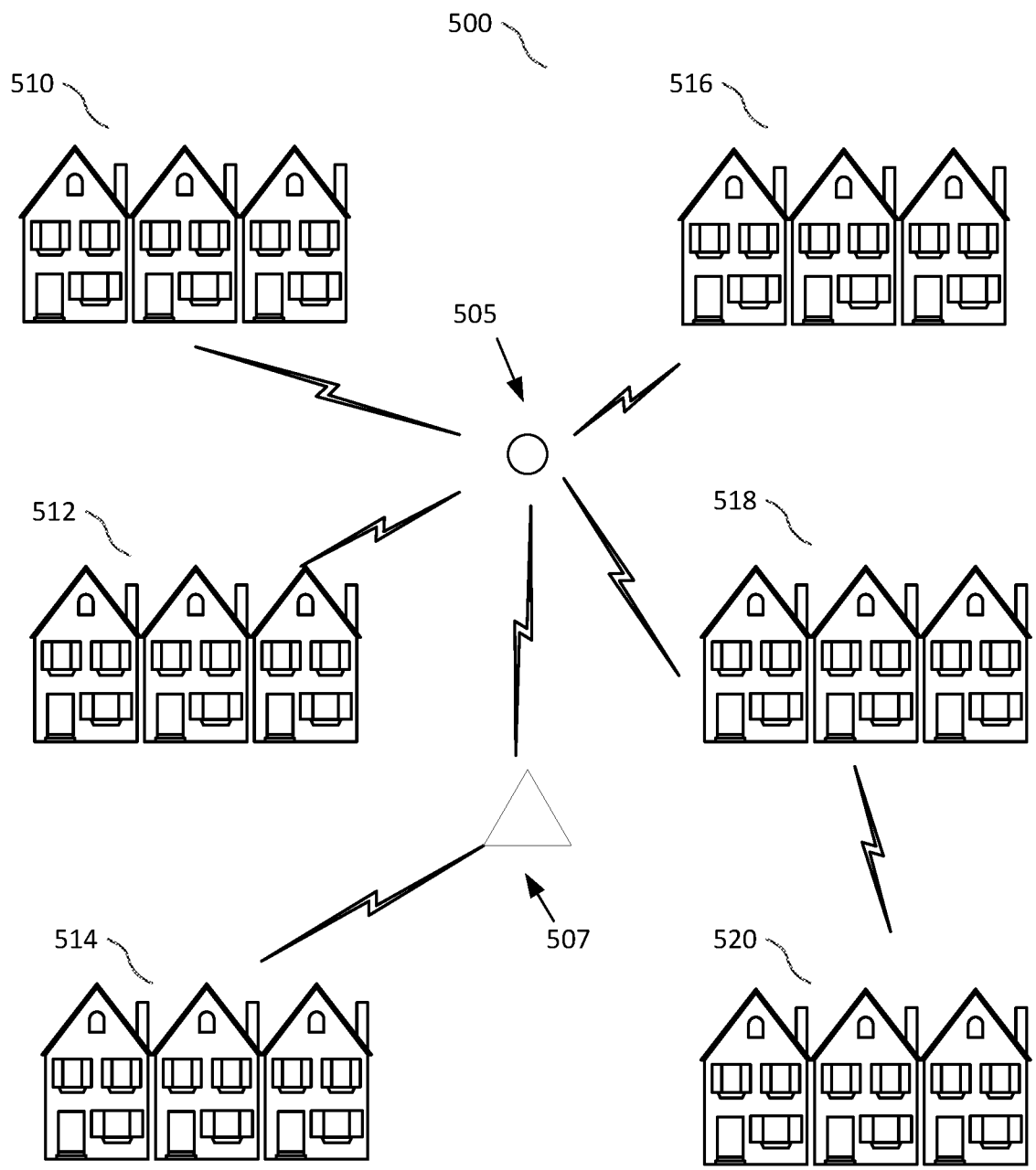
FIG. 5 shows an example range-extending device layout.

FIG. 5 shows an example neighborhood 500 in which wireless devices may be connected to an access point 505 (e.g., for connection to the Internet or another network) and that may comprise one or more range-extending devices (such as range-extending device 507). Buildings 510, 512, 514, 516, 518, 520 may comprise houses, commercial buildings, apartment buildings, or any other type of building. A building may comprise one or more range-extending devices that may relay information to another building or an access point. For example, one or more devices within the building 518 may act as range-extending devices for the building 520. Data traffic going from the access point 505 to wireless devices in the building 520 (or from such wireless devices to the access point 505) may be routed through a range-extending device inside the building 518. For example, wireless devices within the building 520 may use 5G NR to send traffic to wireless devices within the building 518. The mapping server 122 may receive information indicating rooms and/or buildings in an area.

Devices within one or more buildings may use a range-extending device located on a telephone pole or other tower to communicate via the access point 505. For example, wireless devices within the building 514 may be out of range of the access point 505 and may route networking traffic through the range-extending device 507 to be able to communicate via the access point 505. Wireless devices within one or more buildings in the neighborhood 500 may be within range of the access point 505 and may access one or more networks (e.g., the Internet) directly via the access point 505.

Figure 6:
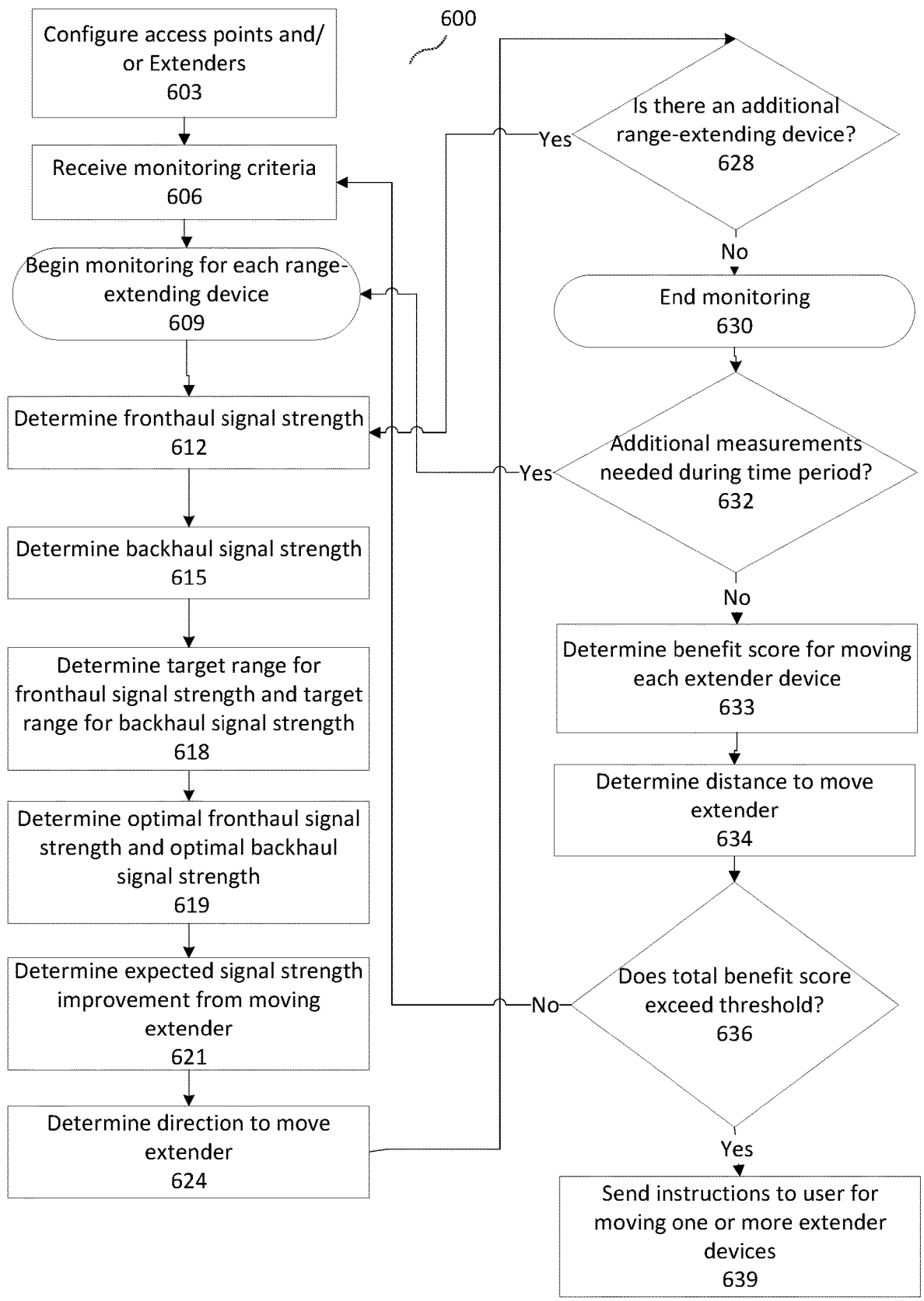
FIG. 6 shows an example method for determining locations for one or more range-extending devices.

FIG. 6 shows an example method 600 for managing range-extending devices. The example method 600 may be used to determine whether to add, whether to move, and/or a direction to move, range-extending devices such as those described in connection with FIGS. 3-5. Although one or more steps of the example method of FIG. 6 are described for convenience as being performed by the mapping server 122 and devices within the area 400, one, some, or all of such steps may be performed by one or more other devices, and steps may be distributed among one or more devices, including any devices such as those described in connection with FIGS. 1-5 (e.g., the access points 305, 405, 505; the range-extending devices 310, 410, 412, 414, 416, 507; or the client devices 315, 420, 421, 422, 423). Although some steps may be described as being performed by a specific range-extending device/client device, some or all of such steps may also or alternatively be performed by any of the range-extending devices, client devices, or access points described in connection with FIGS. 1-5 and/or by other computing devices. One or more steps of the example method of FIG. 6 may be rearranged, modified, repeated, and/or omitted. Although signal strength is used in the steps below, signal quality or signal loss may be used. For example, measurements and/or determinations described below may be performed based on signal strength. When an improvement is described, the improvement could be considered a metric or measurement such as either increasing signal strength (or quality) or decreasing signal loss. Similarly, a first signal quality or strength (e.g., one of a fronthaul connection or a backhaul connection) being lower than a second signal quality or strength (e.g., the other of the fronthaul connection or the backhaul connection) would correspond to a first signal loss being higher than a second signal loss. Signal loss may be used as an indication of signal quality. Signal strength may be used as an indication of signal quality and/or signal loss.

At step 603, one or more access points and range-extending devices may be configured. Devices within the area 400 may send configuration information to the access point 405, and the access point 405 may send the configuration information to the mapping server 122. The configuration information may comprise what devices are in the area 400, and an indication of signal strength between two devices in the area 400 (e.g., between an access point and a range-extending device, between two range-extending devices, and/or between a range-extending device and a client device). For example, each range-extending device that is within range of the access point 405 may identify itself to the access point 405, and may identify any devices, such as client or associated devices, that are connected to it. In some examples, range-extending devices may be connected so that a range-extending device may send information to one or more range-extending devices until it reaches the access point 405. Each range-extending device in such a chain of connections may identify itself to the access point 405. The access point 405 may receive communications from client devices that enter or leave the area and may send information identifying those client devices to the mapping server 122.

At step 606, monitoring criteria may be received. For example, the mapping server 122 may receive monitoring criteria from a user. Devices in the area 400 may be monitored (as discussed in more detail below) to determine whether a wireless device should be moved and a direction in which the wireless device should be moved to increase signal strength between the devices. The monitoring criteria may be used by the mapping server 122 and other devices within the area 400 to determine how to monitor the devices in the area 400. The monitoring criteria may comprise a time period (e.g., 12 hours, 2 days, 1 week, 1 month, 1 year, etc.) to monitor the area 400 and a frequency at which signal strength measurements are taken (e.g., once per hour, once every 3 hours, twice per day, once per day, etc.). The monitoring criteria and/or user preferences (e.g., for an end user in a home and/or a system administrator) may specify which devices to monitor. For example, when determining locations for range-extending devices, the mapping server 122 may ignore one or more client devices and/or range-extending devices in the monitoring area. For example, a client device may use a separate Internet connection that does not go through the access point 405 and thus the mapping server 122 may receive no signal strength measurements from the client device. The mapping server 122 may cause access point 405 and devices (e.g., range-extending devices, client devices) within the area 400 to take signal strength measurements according to the criteria. For example, the mapping server may cause each access point and range-extending device within the area 400 to record, once every hour, signal strength from devices that each range-extending device and access point is connected to, over a period of two days.

At step 609, monitoring of each range-extending device may begin (e.g., the monitoring may be performed in a loop). During the monitoring, steps 612-628 may be performed for each range-extending device in the area 400 being monitored. Although the monitoring beginning in step 609 is described for convenience as being performed for the range-extending device 416, the monitoring may be performed for each range-extending device in the area 400 and/or any range-extending device such as those described in connection with FIGS. 1-5. The monitoring may be performed for each range-extending device (e.g., each range-extending device in the area 400) multiple times over a time period specified by the monitoring criteria discussed above in step 606. For example, the time period may be one week and the monitoring may be performed once every hour. In this example, steps 612-628 in the monitoring may be performed 168 (7 days, once per hour) times for each range-extending device in the area 400. The monitoring may be performed by the mapping server 122 (or another device such as those described in connection with FIGS. 1-3). The mapping server 122 (or another device such as those described in connection with FIGS. 1-3) may determine which range-extending devices in the area should be monitored and if there are additional range-extending devices to add to the monitoring. The mapping server 122 (or another device such as those described in connection with FIGS. 1-3) may determine when to send requests to each range-extending device (e.g., by using the monitoring criteria to determine how often measurements should be recorded during the time period) for signal strength information. The mapping server 122 may receive the signal strength information and record it for use in other steps described in FIG. 6.

At step 612, fronthaul signal strength (or signal quality) may be determined for the range-extending device 416. To determine fronthaul signal strength, the range-extending device 416 may determine signal strength between the range-extending device 416 and each of one or more client devices. The signal strength may comprise a strength of signal, sent by the range-extending device 416, to a client device. The signal strength may comprise a quality of strength, sent by a client device, to the range-extending device 416. Signal strength may be measured and/or otherwise calculated by the range-extending device 416 (e.g., for a signal received by the range-extending device 416 from a client device or from another range-extending device). Signal strength may be measured and/or otherwise calculated for a signal sent by the range-extending device 416 by a client device or other range-extending device that receives that signal. If signal strength is determined by a client device or other range-extending device that receives that signal, the signal quality may be sent by that range-extending device or client device to the range-extending device 416. The range-extending device 416 may send the determined signal quality to the mapping server 122 to be used in additional steps described below. Signal loss may be used as an indication of signal quality. The range-extending device 416 may approximate the signal strength by measuring a signal received from the wireless device (e.g., a client device, range-extending device, or access point). For example, the signal loss may be approximated using Received Signal Strength Indication (RSSI). RSSI may be inversely correlated to signal loss (links with higher RSSI have lower signal loss) and may be measured in decibels (dB) or decibel-milliwatts (dBm). The range-extending device 416 may use the transmit power of the wireless device (e.g., client device 423) to which the range-extending device 416 is connected with, to determine RSSI. The wireless device may communicate its transmit power to the range-extending device 416. Alternatively, the range-extending device 416 may have incomplete information of the transmit power of a wireless device (e.g., client device 423) it is connected to, but the range-extending device 416 may know the approximate range of the transmit power of the device. The upper bound of the transmit power may be limited by government regulations. The lower bound of the transmit power may be estimated based on the device type of the wireless device to which the range-extending device 416 is connected. The range-extending device 416 may estimate, based on the upper and lower bounds, a value for the transmit power of the wireless device and may use it with the measured received signal level to approximate the signal loss.

The fronthaul signal strength may be measured from signals received from client devices that are connected to the range-extending device 416. For example, if the range-extending device 416 is connected to the client devices 423 and 422, and the access point 405, the fronthaul signal strength may be represented by the RSSI received from only the client devices 423 and 422. The fronthaul signal strength may be the average signal strength of signals received from some or all client devices connected to the range-extending device during the time at which a signal strength measurement is taken. For example, the fronthaul signal strength may be the average signal strength, of a signal sent by the client devices 423 and 422, to the range-extending device 416. The fronthaul signal strength may be the median signal strength of signals sent by some or all client devices connected to the range-extending device during a measuring time period. The fronthaul signal strength may be the signal strength of a signal received from a client device that has the greatest signal strength of devices connected to the range-extending device 416. The fronthaul signal strength may be the signal strength of a signal received from the client device that has the lowest signal strength of client devices connected to the range-extending device 416.

At step 615, backhaul signal strength may be determined. The backhaul signal strength may be estimated using RSSI. The backhaul signal loss may be measured from access points to which the range-extending device 416 is connected. For example, if the range-extending device 416 is connected to the client devices 423 and 422, and the access point 405, the backhaul signal strength may be represented by the RSSI received from only the access point 405. The access point 405 may measure signal strength between the access point 405 and the range-extending device 416. Alternatively, the range-extending device 416 may measure signal strength between the range-extending device 416 and the access point 405. The measurements may be sent to the mapping server 122 for use in other steps in FIG. 6 described below.

At step 618, a target range for fronthaul signal strength and a target range for backhaul signal strength may be determined. The fronthaul signal strength range may be indicated by an acceptable maximum and acceptable minimum fronthaul signal strength (or signal loss, or signal quality) values. The backhaul signal strength range may be indicated by acceptable maximum and acceptable minimum backhaul signal strength (or signal loss, or signal quality) values. The minimum and maximum signal strength values may be received from a user or a computing device. The target ranges for fronthaul and backhaul signal strengths may be indicated using RSSI values. The target ranges for fronthaul and backhaul signal strength may be communicated to the mapping server 122 for use in other steps described below. In the steps below, $RSS_{bhTmax}$ may refer to the RSSI of the target backhaul maximum and $RSSI_{bhTmin}$ may refer to the RSSI of the target backhaul minimum. The $RSSI_{bhTmin}$ and the $RSSI_{bhTmax}$ may form the backhaul target range. In the steps below, $RSSI_{fhTmax}$ may refer to the RSSI of the target fronthaul maximum and $RSSI_{fhTmin}$ may refer to the RSSI of the target fronthaul minimum. The $RSSI_{fhTmin}$ and the $RSSI_{fhTmax}$ may form the fronthaul target range. The backhaul link may be emphasized over the fronthaul link. For example, the target range of the backhaul signal strength may be greater than the target range of the fronthaul signal strength (e.g., the minimum backhaul signal strength may be greater than the minimum fronthaul signal strength). Using ranges where the backhaul signal strength is higher than the fronthaul signal strength may allow for improved network connectivity if a backhaul link of a given range-extending device may need to transport more data than any of the individual fronthaul links of that range-extending device. By emphasizing the signal strength of the backhaul link over the fronthaul link, the backhaul link may be able to transport data at a faster rate.

At step 619, a predicted optimal fronthaul signal strength and a predicted optimal backhaul signal strength may be determined. The optimal fronthaul signal strength and the optimal backhaul signal strength may indicate signal strengths of the fronthaul (e.g., between a range-extending device and one or more client devices) and backhaul (e.g., between a range-extending device and an access point) links that are predicted to improve user experience for a user of the range-extending device 416. The optimal fronthaul signal strength and the optimal backhaul signal strength may indicate signal strengths beyond which an improvement is unlikely to lead to a better connection for a backhaul link and fronthaul link, respectively (e.g., even if the signal strength were increased it would be unlikely to increase bandwidth, reduce latency, reduce error rate or packet loss, or otherwise improve the overall performance of communication between two devices). The optimal fronthaul and backhaul signal strengths may be represented using RSSI. The optimal fronthaul and backhaul signal strengths may be signal strengths that are predicted to be achieved after moving the range-extending device.

The optimal fronthaul signal strength and optimal backhaul signal strength may be determined based on the fronthaul target range and/or backhaul target range determined in step 618. $RSSI_{bho}$ may represent the optimal signal strength (e.g., RSSI) of the backhaul link after the range-extending device 416 is moved. $RSSI_{fho}$ may represent the optimal signal strength (e.g., RSSI) of the fronthaul link after the range-extending device 416 is moved. The $RSSI_{bho}$ and $RSSI_{fho}$ may be RSSI levels beyond which an improvement is unlikely to lead to a better connection for a backhaul link and fronthaul link, respectively (e.g., even if the RSSI were improved it would be unlikely to increase bandwidth, reduce latency, reduce error rate or packet loss, or otherwise improve the overall performance of communication between two devices). $RSSI_{bha}$ may represent the current RSSI of the backhaul link (e.g., the value at the time of measurement before the range-extending device is moved). $RSSI_{bha}$ may be the backhaul signal strength determined in step 615. $RSSI_{fha}$ may represent the current RSSI of the fronthaul link (e.g., the value at the time of measurement before the range-extending device is moved). $RSSI_{fha}$ may be the fronthaul signal strength determined in step 612.

Determining the optimal backhaul signal strength may be based on a comparison between the current fronthaul and backhaul signal strengths and the target ranges (e.g., minimum and maximum) for fronthaul and backhaul signal strengths. For example, the optimal backhaul signal strength may be determined by balancing the backhaul signal strength and the fronthaul signal strength. For example, if moving a range-extending device a distance improves the backhaul signal strength but causes the fronthaul signal strength to decrease below a threshold, then the distance may be reduced. The target ranges (or the minimum backhaul signal strength and the minimum fronthaul signal strength) may be different. The optimal backhaul signal strength and optimal fronthaul signal strength may reflect the difference. For example, the minimum backhaul signal strength and minimum fronthaul signal strength may be different because traffic for multiple client devices may traverse the backhaul link but each fronthaul link may service a single client device and therefore each fronthaul link may carry a subset of the traffic carried by the backhaul link. Because of this or other reasons, the target ranges of the backhaul signal strength and fronthaul signal strength may have different minimum values. For example, the optimal backhaul RSSI may be determined as follows:

$$\text{IF} \left( \left( \frac{(RSSI_{bha} + RSSI_{fha})}{2} - \frac{(RSSI_{fhTmin} - RSSI_{bhTmin})}{2} \right) \leq RSSI_{bhTmax} \right)$$
$$\{$$
$$RSSI_{bho} = \frac{(RSSI_{bha} + RSSI_{fha})}{2} - \frac{(RSSI_{fhTmin} - RSSI_{bhTmin})}{2}$$
$$\}$$
ELSE
$$\{$$
$$RSSI_{bho} = RSSI_{bhTmax}$$
$$\}$$

If the backhaul and fronthaul links are of equal importance, $RSSI_{fhTmin}$ may be equal to $RSSI_{bhTmin}$. If they are of equal importance, the optimal backhaul RSSI ($RSSI_{bho}$) and/or the optimal fronthaul RSSI ($RSSI_{fho}$) may be the average of the backhaul and fronthaul RSSI values (e.g., $RSSI_{bha}$ and $RSSI_{fha}$). If the backhaul link is valued more than the fronthaul link (e.g., the target range for the backhaul link ($RSSI_{bhTmin}$) has a higher minimum value than the target range for the fronthaul link ($RSSI_{fhTmin}$)), the optimal backhaul RSSI may be greater than the average of the backhaul and fronthaul RSSI values (and the optimal fronthaul RSSI may be less than the average). If the fronthaul link is valued more than the backhaul link, the optimal backhaul RSSI may be less than the average of the backhaul and fronthaul RSSI values (and the optimal fronthaul RSSI may be greater than the average).

Determining the optimal fronthaul signal loss may be based on a comparison between the current fronthaul and backhaul signal strengths and the target ranges (e.g., minimum and maximum) for fronthaul and backhaul signal strengths. For example, the optimal fronthaul signal strength may be determined by balancing the fronthaul signal strength and the backhaul signal strength. For example, if moving a range-extending device a distance improves the fronthaul signal strength but causes the backhaul signal strength to decrease below a threshold, then the distance may be reduced. For example, the optimal fronthaul RSSI may be determined as follows:

$$\text{IF} \left( \left( \frac{(RSSI_{bha} + RSSI_{fha})}{2} - \frac{(RSSI_{bhTmin} - RSSI_{fhTmin})}{2} \right) \leq RSSI_{fhTmax} \right)$$
$$\{$$

-continued $$RSSI_{fho} = \frac{(RSSI_{bha} + RSSI_{fha})}{2} - \frac{(RSSI_{bhTmin} - RSSI_{fhTmin})}{2}$$

}

ELSE

{

$$RSSI_{fho} = RSSI_{fhTmax}$$

}

At step 621, the expected signal strength improvement from moving the range-extending device may be determined. The expected improvement may be determined by the mapping server 122, an access point, a range-extending device, and/or a client device. As discussed above in steps 612 and 615, the mapping server 122 may receive signal strength information from the range-extending device, client device, and/or access point. The mapping server 122 may use the signal strength information to determine the expected improvement of moving the range-extending device. The expected improvement may comprise a fronthaul signal improvement ($RSSI_{fhi}$) and a backhaul signal improvement ($RSSI_{bhi}$). The total improvement may be equal to the sum of the fronthaul signal improvement and the backhaul signal improvement.

Determining the expected fronthaul signal improvement may comprise comparing the current fronthaul signal strength ($RSSI_{fha}$) with the fronthaul minimum target ($RSSI_{fhTmin}$). Additionally or alternatively, determining the expected fronthaul signal improvement may comprise comparing the optimal RSSI of the fronthaul link ($RSSI_{fho}$) with the fronthaul minimum target ($RSSI_{rhTmin}$). Additionally or alternatively, determining the expected fronthaul signal improvement may comprise determining the difference between an optimal fronthaul signal strength ($RSSI_{fho}$) and the fronthaul minimum target ($RSSI_{fhTmin}$). Additionally or alternatively, the expected fronthaul signal improvement may be equal to $RSSI_{fhTmin} - RSSI_{fha}$.

To determine the fronthaul signal loss improvement, the mapping server 122 may determine if the improvement may be limited due to the fronthaul signal strength being greater than the minimum target fronthaul signal strength determined in step 618. Additionally, the mapping server 122 may determine if the improvement is limited due to the optimal fronthaul signal strength (e.g., determined in step 619) being greater than the minimum target fronthaul signal strength. For example, the fronthaul signal loss improvement may be determined as shown in the following pseudo-code:

```
IF (RSSI_fha>RSSI_fhTmin) {
    IF (RSSI_fho>RSSI_fhTmin) {
        RSSI_fhi=0
    }
    ELSE {
        RSSI_fhi=RSSI_fho-RSSI_fhTmin
    }
}
ELSE {
    IF (RSSI_fho>RSSI_fhTmin) {
        RSSI_fhi=RSSI_fhTmin-RSSI_fha
    }
    ELSE {
        RSSI_fhi=RSSI_fho-RSSI_fhTmin
    }
}
```

Determining the expected backhaul signal improvement may comprise comparing the current backhaul signal loss ($RSSI_{bha}$) with the backhaul minimum target ($RSSI_{bhTmin}$). Additionally or alternatively, determining the expected backhaul signal improvement may comprise comparing the optimal RSSI of the backhaul link ($RSSI_{bho}$) with the backhaul minimum target ($RSSI_{bhTmin}$). Additionally or alternatively, determining the expected backhaul signal improvement may comprise determining the difference between an optimal backhaul signal loss ($RSSI_{bho}$) and the backhaul minimum target ($RSSI_{bhTmin}$). Additionally or alternatively, the expected backhaul signal improvement may be equal to $RSSI_{bhTmin} - RSSI_{bha}$.

To determine the backhaul signal loss improvement, the mapping server 122 may determine if the improvement may be limited due to the backhaul signal strength being greater than the minimum target backhaul signal strength determined in step 618. Additionally, the mapping server 122 may determine if the improvement is limited due to the optimal backhaul signal strength (e.g., determined in step 619) being greater than the minimum target backhaul signal strength. For example, the backhaul signal loss improvement may be determined as shown in the following pseudocode:

```
IF (RSSI_bha>RSSI_bhTmin) {
    IF (RSSI_bho>RSSI_bhTmin) {
        RSSI_bhi=0
    }
    ELSE {
        RSSI_bhi=RSSI_bho-RSSI_bhTmin
    }
}
ELSE {
    IF (RSSI_bho>RSSI_bhTmin) {
        RSSI_bhi=RSSI_bhTmin-RSSI_bha
    }
    ELSE {
        RSSI_bhi=RSSI_bho-RSSI_bhTmin
    }
}
```

At step 624, a direction to move the range-extending device 416 may be determined. The determination may be based on the determination of the $RSSI_{bhi}$ and $RSSI_{fhi}$ (e.g., determined in step 621 of the current iteration of the monitoring) for the range-extending device 416. The mapping server 122 may determine which direction to move the range-extending device 416. The determination may be based on a comparison between the predicted backhaul improvement (e.g., $RSSI_{bhi}$) and fronthaul improvement (e.g., $RSSI_{fhi}$). If the predicted backhaul improvement is greater than the predicted fronthaul improvement, it may be determined to move the range-extending device closer to an access point or another range-extending device. If the predicted fronthaul improvement is greater than the predicted backhaul improvement for the range-extending device 416, it may be determined to move the range-extending device 416 away from the access point 405. As an additional example, if the predicted backhaul improvement is greater than the predicted fronthaul improvement for the range-extending device 414, it may be determined to move the range-extending device 414 closer to the range-extending device 416 because range-extending devices may be daisy chained to extend coverage of the access point 405. In this example, it may be determined to move the range-extending device 414 closer to the range-extending device 416 (instead of moving the range-extending device 414 closer towards access point 405) because the range-extending device 416 is the closest range-extending device or access point to the range-extending device 414.

The backhaul link may be emphasized over the fronthaul link when determining a direction to move a range-extending device. For example, if moving a range-extending device in one direction would make the backhaul signal strength weaker than the fronthaul signal strength, it may be determined to not move the range-extending device, reduce the distance that the range-extending device is moved, or move the range-extending device in the opposite direction.

At step 628, whether there are additional range-extending devices may be determined. If there is an additional range-extending device in the area 400, Steps 612-628 may be performed for the additional range-extending device. If there are no additional range-extending devices, then at step 630, the monitoring for each range-extending device may end. Steps 612-628 may be performed a number of times according to the time period and frequency discussed in step 606 of FIG. 6 above.

At step 632, whether additional measurements are needed during the time period may be determined. The mapping server 122 may determine whether additional measurements are needed based on the time period and frequency discussed above in step 606. For example, if the time period is three days and the frequency of measurements is once per hour (e.g., for each range-extending device) then a total of 72 measurements may be made (e.g., the monitoring beginning at step 609 may be performed 72 times). If the total quantity of monitoring iterations have not been performed, step 609 may be performed and the monitoring may be repeated. If additional measurements are not needed during the time period (e.g., the total quantity of monitoring iterations have been completed) step 633 may be performed.

At step 633, a benefit score for moving each range-extending device in the area 400 may be determined. For example, the benefit score may be a score between 0 and 100, where 0 indicates no predicted benefit (e.g., no improvement or very little improvement for one or more connections with one or more range-extending devices) and 100 indicates a maximum predicted benefit (e.g., maximum improvement in signal strength for one or more connections with one or more range-extending devices).

As described above, multiple signal quality determinations for each range-extending device may be made during the monitoring time period (e.g., during one or more of steps 612-628) and the benefit score may be based on the multiple signal quality determinations. The benefit score may be based on the expected signal strength improvements determined during one or more iterations of step 621 (e.g., as step 621 is performed multiple times for each range-extending device in the monitoring that begins at step 609) and the number of times a particular improvement (or an improvement in a particular range) was determined. The mapping server 122 may use the signal strength measurements and determinations made in steps 612-624 to determine the benefit score for each range-extending device.

Additionally, the mapping server may use rules to determine the benefit score. The rules may indicate a benefit score that is based on the direction determined to move each range-extending device (as determined in step 624 of FIG. 6), the predicted improvement in signal strength (as determined in step 621 of FIG. 6), and the number of measurements for which one or more criteria are satisfied. For example, a range-extending device within an area may have been monitored for 24 hours, with steps 612-624 being performed once every half hour for the range-extending device. A rule (e.g., Rule 1 described below) may indicate that if it has been determined to move the range-extending device closer to an access point and the predicted benefit was greater than 30 dB for more than half of the datapoints measured (e.g., more than 24 times for this example), then the benefit score is 80 for the range-extending device. Table 1 comprises additional example rules with their associated benefit score. The rules below (including the benefit scores and thresholds) are examples. Different benefit scores and/or thresholds may be used. In the table below, data points may refer to the number of times an expected signal strength improvement was determined (e.g., in step 621) for a particular range-extending device (e.g., for a time period of two days and a frequency of once per hour, there may be 48 data points for a particular range-extending device).

TABLE 1

| Rule Number | Rules | Benefit Score |
|---|---|---|
| 1 | Move range-extending device closer to access point, improvement > 30 dB (>50% of data points) | 80 |
| 2 | Move range-extending device closer to access point, improvement > 30 dB (>=25 && <50% of data points) | 50 |
| 3 | Move range-extending device closer to access point, improvement >= 25 && < 30 dB (>50% of data points) | 70 |
| 4 | Move range-extending device closer to access point, improvement >= 25 && < 30 dB (>=25 && <50% of data points) | 35 |
| 5 | Move range-extending device closer to access point, improvement >= 20 && < 25 dB (>50% of data points) | 60 |
| 6 | Move range-extending device closer to access point, improvement >= 20 && < 25 dB (>=25 && <50% of data points) | 30 |
| 7 | Move range-extending device closer to access point, improvement >= 15 && < 20 dB (>50% of data points) | 30 |
| 8 | Move range-extending device closer to access point, improvement >= 15 && < 20 dB (>=25 && <50% of data points) | 15 |
| 9 | Move range-extending device closer to access point, improvement >= 10 && < 15 dB (>50% of data points) | 15 |
| 10 | Move range-extending device closer to access point, improvement >= 10 && < 15 dB (>=25 && <50% of data points) | 7 |
| 11 | Move range-extending device closer to access point, improvement >= 5 && < 10 dB (>50% of data points) | 5 |
| 12 | Move range-extending device closer to access point, improvement >= 5 && < 10 dB (>=25 && <50% of data points) | 0 |
| 13 | Move range-extending device closer to access point, improvement >= 0 && < 5 dB (>50% of data points) | 0 |
| 14 | Move range-extending device closer to access point, improvement >= 0 && < 5 dB (>=25 && <50% of data points) | 0 |
| 15 | Move range-extending device away from access point, improvement >= 0 && < 5 dB (>50% of data points) | 0 |
| 16 | Move range-extending device away from access point, improvement >= 0 && < 5 dB (>=25 && <50% of data points) | 0 |
| 17 | Move range-extending device away from access point, improvement >= 5 && < 10 dB (>50% of data points) | 2 |
| 18 | Move range-extending device away from access point, improvement >= 5 && < 10 dB (>=25 && <50% of data points) | 0 |
| 19 | Move range-extending device away from access point, improvement >= 10 && < 15 dB (>50% of data points) | 10 |

TABLE 1-continued

| Rule Number | Rules | Benefit Score |
|---|---|---|
| 20 | Move range-extending device away from access point, improvement >= 10 && < 15 dB (>=25 && <50% of data points) | 5 |
| 21 | Move range-extending device away from access point, improvement >= 15 && < 20 dB (>50% of data points) | 20 |
| 22 | Move range-extending device away from access point, improvement >= 15 && < 20 dB (>=25 && <50% of data points) | 10 |
| 23 | Move range-extending device away from access point, improvement >= 20 && < 25 dB (>50% of data points) | 50 |
| 24 | Move range-extending device away from access point, improvement >= 20 && < 25 dB (>=25 && <50% of data points) | 25 |
| 25 | Move range-extending device away from access point, improvement >= 25 && < 30 dB (>50% of data points) | 60 |
| 26 | Move range-extending device away from, improvement >= 25 && < 30 dB (>=25 && <50% of data points) | 30 |
| 27 | Move range-extending device away from access point, improvement > 30 dB (>50% of data points) | 80 |
| 28 | Move range-extending device away from access point, improvement > 30 dB (>=25 && <50% of data points) | 50 |

According to Rule 1 in Table 1, a benefit score of 80 may be determined for a range-extending device where the expected signal quality improvement for moving the device closer to the access point is more than 30 dB for more than 50% of the data points. According to Rule 2, a benefit score of 50 may be determined for a range-extending device where the expected signal quality improvement for moving the device closer to the access point is more than 30 dB for 25%-50% of the data points. According to Rule 3, a benefit score of 70 may be determined for a range-extending device where the expected signal quality improvement for moving the device closer to the access point is 25 dB-30 dB for more than 50% of the data points. According to Rule 4, a benefit score of 35 may be determined for a range-extending device where the expected signal quality improvement for moving the device closer to the access point is 25 dB-30 dB for 25%-50% of the data points. According to Rule 5, a benefit score of 60 may be determined for a range-extending device where the expected signal quality improvement for moving the device closer to the access point is 20 dB-25 dB for more than 50% of the data points. According to Rule 6, a benefit score of 30 may be determined for a range-extending device where the expected signal quality improvement for moving the device closer to the access point is 20 dB-25 dB for 25%-50% of the data points. According to Rule 7, a benefit score of 30 may be determined for a range-extending device where the expected signal quality improvement for moving the device closer to the access point is 15 dB-20 dB for more than 50% of the data points. According to Rule 8, a benefit score of 15 may be determined for a range-extending device where the expected signal quality improvement for moving the device closer to the access point is 15 dB-20 dB for 25%-50% of the data points. According to Rule 9, a benefit score of 15 may be determined for a range-extending device where the expected signal quality improvement is 10 dB-15 dB for more than 50% of the data points. According to Rule 10, a benefit score of 7 may be determined for a range-extending device where the expected signal quality improvement for moving the device closer to the access point is 10 dB-15 dB for 25%-50% of the data points. According to Rule 11, a benefit score of 5 may be determined for a range-extending device where the expected signal quality improvement for moving the device closer to the access point is 5 dB-10 dB for more than 50% of the data points. According to Rule 12, a benefit score of 0 may be determined for a range-extending device where the expected signal quality improvement for moving the device closer to the access point is 5 dB-10 dB for 25%-50% of the data points. According to Rule 13, a benefit score of 0 may be determined for a range-extending device where the expected signal quality improvement for moving the device closer to the access point is 0 dB-5 dB for more than 50% of the data points. According to Rule 14, a benefit score of 0 may be determined for a range-extending device where the expected signal quality improvement for moving the device closer to the access point is 0 dB-5 dB for 25%-50% of the data points.

According to Rule 15, a benefit score of 0 may be determined for a range-extending device where the expected signal quality improvement for moving the device away from the access point is 0 dB-5 dB for more than 50% of the data points. According to Rule 16, a benefit score of 0 may be determined for a range-extending device where the expected signal quality improvement for moving the device away from the access point is 0 dB-5 dB for 25%-50% of the data points. According to Rule 17, a benefit score of 2 may be determined for a range-extending device where the expected signal quality improvement for moving the device away from the access point is 5 dB-10 dB for more than 50% of the data points. According to Rule 18, a benefit score of 0 may be determined for a range-extending device where the expected signal quality improvement for moving the device away from the access point is 5 dB-10 dB for 25%-50% of the data points. According to Rule 19, a benefit score of 10 may be determined for a range-extending device where the expected signal quality improvement for moving the device away from the access point is 5 dB-10 dB for more than 50% of the data points. According to Rule 20, a benefit score of 5 may be determined for a range-extending device where the expected signal quality improvement for moving the device away from the access point is 10 dB-15 dB for 25%-50% of the data points. According to Rule 21, a benefit score of 20 may be determined for a range-extending device where the expected signal quality improvement for moving the device away from the access point is 15 dB-20 dB for more than 50% of the data points. According to Rule 22, a benefit score of 10 may be determined for a range-extending device where the expected signal quality improvement for moving the device away from the access point is 15 dB-20 dB for 25%-50% of the data points. According to Rule 23, a benefit score of 50 may be determined for a range-extending device where the expected signal quality improvement for moving the device away from the access point is 20 dB-25 dB for more than 50% of the data points. According to Rule 24, a benefit score of 25 may be determined for a range-extending device where the expected signal quality improvement for moving the device away from the access point is 20 dB-25 dB for 25%-50% of the data points. According to Rule 25, a benefit score of 60 may be determined for a range-extending device where the expected signal quality improvement for moving the device away from the access point is 20 dB-25 dB for more than 50% of the data points. According to Rule 26, a benefit score of 30 may be determined for a range-extending device where the expected signal quality improvement for moving the device away from the access point is 25 dB-30 dB for 25%-50% of the data points.

According to Rule 27, a benefit score of 80 may be determined for a range-extending device where the expected signal quality improvement for moving the device away from the access point is more than 30 dB for more than 50% of the data points. According to Rule 28, a benefit score of 50 may be determined for a range-extending device where the expected signal quality improvement for moving the device away from the access point is more than 30 dB for 25%-50% of the data points.

The rules of Table 1, and/or other rules, may be implemented non-additively. If implemented non-additively, for example, all rules may be applied to a given set of data from iterations of the monitoring being performed in steps 612-628. If multiple rules are satisfied, the highest score from a single satisfied rule may be selected. For example, if there is a greater than 30 dB improvement for 51% of the data points (Rule 1, score weight 80) and a 29 dB improvement for 49% (Rule 4, score weight 35), the benefit score may be 80.

Also or alternatively, the rules of Table 1, and/or other rules, may be implemented additively. For example, if there is a greater than 30 dB improvement for 51% of the data points (score weight 80) and a 29 dB improvement for 49% (score weight 35), the benefit score may be 115. The mapping server 122 may use the rules described above to determine a benefit score for each range-extending device in an area. The mapping server 122 may add the benefit score for each range-extending device to determine an overall benefit score. The rules described above may also be used to determine a direction to recommend moving each range-extending device. Because more than one direction for a particular range-extending device may be determined throughout the monitoring period, the mapping server 122 may determine a final direction to recommend to a user or technician. The direction for recommending the user or technician may be the direction associated with a rule that leads to the highest benefit score. For example, if Rule 18 and Rule 1 both apply to the same range-extending device, then the recommended direction may be to move the range-extending device closer to the gateway because it is associated with a benefit score of 80 as indicated by Rule 1 (as opposed to Rule 18, which indicates a benefit score of 0 for moving the range-extending device away from the access point). Alternatively, the benefit scores for rules associated with movements towards the access point may be positive and the benefit scores for rules associated with movements away from the access point may be negative. After adding the benefit score for each applicable rule, if the benefit score is negative then the direction for recommending the user or technician may be away from the access point. After adding the benefit score for each applicable rule, if the benefit score is positive then the direction for recommending the user or technician may be towards the access point. For example, if there is a greater than 30 dB improvement for moving the range-extending device closer to the access point for 51% of the data points (Rule 1, score weight 80) and there is a 12 dB improvement for moving the range-extending device away from the access point for 49% of the data points (Rule 20, score weight 5), then the benefit score may be 75 and the recommended direction may be to move the range-extending device closer to the access point.

The benefit score of moving a range-extending device may be determined and/or adjusted based on user preferences. When determining the benefit score of moving a range-extending device, the benefit score may be adjusted based on devices in the area 400 and the direction to move the range-extending device determined in step 624. One or more devices may have different levels of priority to weight the benefit score in their favor so that when the range-extending device is moved, they are more likely to have stronger signal strength with the range-extending device. User preferences may indicate particular devices within the area 400 to prioritize. For example, a rule may normally indicate a benefit score for moving a range-extending device away from an access point. If the range-extending device is also being moved closer to the preferred device, the benefit score may be increased beyond (e.g., double, triple, etc.) what it is normally. For example, a preferred client device may be a desktop computer. The benefit score may be weighted in favor of the desktop computer because it is a preferred client device. For example, a rule may normally indicate a benefit score of 40 for moving a range-extending device away from an access point. If the range-extending device is also being moved closer to the desktop computer, the benefit score may be adjusted to 80 instead of 40. User preferences may make the range-extending device more likely to be moved toward preferred devices such as the desktop computer. User preferences may make the range-extending device less likely to move away from preferred devices such as the desktop computer. For example, a rule may normally indicate a benefit score of 50 for moving a range-extending device closer to an access point. If the range-extending device is also being moved away from a preferred device, the benefit score may be adjusted to 25 instead of 50.

A user may input which devices should be given signal strength priority. For example, a user may indicate that a desktop computer and television should be given priority for determining benefit score. Also or alternatively, a weighting may be applied based on the device type determined from device fingerprinting. The benefit score may be weighted towards devices that require large bandwidths. For example, a user may indicate that a wireless device requires large bandwidth for gaming. Also or alternatively, a device type that may use high throughput in normal operation (e.g., a media player device) may be weighted higher than a device type that may not require high throughput (e.g., an IoT thermostat). The benefit score may be weighted towards particular buildings in a neighborhood, campus, or other area containing multiple buildings. For example, some buildings or rooms in an area may hold more important meetings and the benefit score may prioritize devices in those buildings or rooms to ensure they have stronger signal strength with one or more range-extending devices. The mapping server 122 may increase the benefit score for movements that put the range-extending device closer to a high priority room or building.

The benefit score may be weighted based on a mobility level of a device. The mapping server 122 may increase the benefit score for movements that put the range-extending device closer to devices that are less mobile. For example, desktop computers, televisions, smart refrigerators, ovens, stoves, other kitchen appliances, washing machines, dryers, manufacturing equipment, other devices that may be difficult to move may be weighted more heavily because they may be harder to move than some devices (e.g., a cell phone, laptop computer, etc.).

At step 634, a distance to move the range-extending device may be determined. The distance may be determined based on the predicted improvement in signal strength (e.g., $RSSI_{bhi}$ or $RSSI_{fhi}$) indicated by a rule described above. The distance may be determined by converting the predicted improvement in signal strength into a distance based on an estimated path loss of the signal. For example, if the predicted improvement in signal strength is 30 dB the path loss may be estimated to be 1 dB per 1 foot of distance and the distance to move the range-extending device may be determined to be 30 feet. If the distance to move the range-extending device exceeds or otherwise satisfies a threshold, the mapping server 122 may determine that, instead of moving the range-extending device, a new range-extending device should be added. The new range-extending device may be added at a location indicated by the distance determined in step 634. For example, the mapping server may determine that the range-extending device should be moved 41 feet away from the access point. In this example, if the threshold distance is 40 feet, the mapping server 122 may recommend to add a new range-extending device in a location that is 41 feet away from the access point, and may recommend not moving the range-extending device.

The backhaul link may be emphasized over the fronthaul link when determining a distance to move a range-extending device. For example, if moving a range-extending device a distance would make the backhaul signal strength weaker than the fronthaul signal strength, it may be determined to decrease the distance the range-extending device moves to ensure that the backhaul signal strength remains stronger than the fronthaul signal strength.

At step 636, whether the total benefit score exceeds a threshold may be determined. The total benefit score may be the sum of the benefit scores for each range-extending device in the area 400. The threshold may be any benefit score (e.g., 50, 200, 500, 1000, etc.). The threshold may vary based on the number of devices within the area 400. For example, the threshold may be higher for an area that contains 7 range-extending devices as compared to an area that has only 3 range-extending devices. The threshold may be based on the average benefit score of each range-extending device in the area 400. For example, if the average benefit score of the range-extending devices in the area 400 is greater than 50, the benefit score may be determined to exceed the threshold. If the total benefit score exceeds the threshold, step 639 may be performed. If the total benefit score does not satisfy the threshold, step 606 may be performed as described above.

At step 639, instructions for moving one or more range-extending devices may be sent to a user or technician associated with the area 400. The instructions may indicate for each range-extending device, whether it should be moved, the direction the range-extending device should be moved, and/or the distance the range-extending device should be moved.

FIG. 7 shows an example recommendation 700 for moving range-extending devices (e.g., any range-extending devices such as those discussed above in connection with FIGS. 1-6). The recommendation 700 may comprise any measurements or determinations made in connection with FIG. 6 (e.g., the instructions for moving one or more range-extending devices discussed in step 639 of FIG. 6 above). The recommendation 700 may be generated by the mapping server 122, the access point 305, or any other device such as those described in connection with FIGS. 1-6. The recommendation 700 may be sent to any device such as those described in in connection with FIGS. 1-6. For example, the recommendation 700 may be sent to a client device associated with the area that was monitored (e.g., the client device 315) and may be displayed on the client device to a user or technician. The recommendation 700 may be sent over a wireless connection. The recommendation may be sent via the external network 209 or another network that connects to the Internet.

The recommendation 700 may comprise an account number 702 that may indicate an account of a user associated with the area that was monitored. The recommendation 700 may comprise a report date-time 704 indicating when the recommendation was generated. The recommendation 700 may comprise a sample start time 706 and sample end time 708 that indicate a beginning and end time and/or date of the time period for monitoring the area (as described above in step 606 of FIG. 6). The recommendation 700 may comprise a total benefit score 710 that indicates the sum of the benefit scores for each range-extending device in the area that was monitored. The recommendation 700 may comprise a number of devices 712 that indicates the number of range-extending devices that were monitored.

The recommendation 700 may comprise information for each range-extending device in the area that was monitored. For example, the recommendation 700 may indicate the device ID 714, benefit score 716, direction that the range-extending device should be moved (e.g., move direction 718), and distance that the range-extending device should be moved (e.g., move distance 720) for each range-extending device that was monitored. Although device IDs and/or device names shown in F7 are in the form of MAC addresses, the device ID could be in other forms. For example, the device ID could be a name given to a device by a user (e.g., "Mary's laptop"). The move direction 718 may indicate a wireless device the range-extending device should be moved closer to or further away from.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, from a range-extending computing device configured to wirelessly communicate between an access point and a client device, backhaul signal quality data for communications via a backhaul wireless link between the range-extending computing device and the access point;
   predicting, based on the backhaul signal quality data, a backhaul signal quality improvement metric associated with a movement of the range-extending computing device;
   determining, based on the backhaul signal quality improvement metric, a distance to move the range-extending computing device;
   based on a determination that moving the range-extending computing device the distance will cause a fronthaul signal quality, for communications via a fronthaul wireless link between the range-extending computing device and the client device, to be below a threshold, adjusting the distance; and
   sending a recommendation, based on the adjusted distance and based on the backhaul signal quality improvement metric, that indicates a recommended movement of the range-extending computing device.

2. The method of claim 1, wherein the backhaul signal quality data comprise one or more indications of received signal strength.

3. The method of claim 1, wherein the backhaul signal quality data comprise data indicating, for a plurality of times, values for signal quality via the backhaul wireless link.

4. The method of claim 1, further comprising:
determining, based on the backhaul signal quality improvement metric, a score, wherein the sending the recommendation is based on determining that the score exceeds a threshold.

5. The method of claim 1, further comprising:
determining, based on the backhaul signal quality improvement metric, a direction for the recommended movement of the range-extending computing device, wherein the recommendation comprises the direction.

6. The method of claim 1, wherein the recommendation comprises the adjusted distance.

7. The method of claim 1, wherein the receiving comprises receiving the backhaul signal quality data via the access point and one or more additional range-extending computing devices between the range-extending computing device and the access point.

8. The method of claim 1, wherein the determining the distance comprises comparing the backhaul signal quality improvement metric and a target backhaul quality improvement metric.

9. A method comprising:
receiving, from a range-extending computing device configured to wirelessly communicate between an access point and a client device, fronthaul signal quality data for communications via a fronthaul wireless link between the range-extending computing device and the client device;
predicting, based on the fronthaul signal quality data, a fronthaul signal quality improvement metric associated with a movement of the range-extending computing device;
determining, based on the fronthaul signal quality improvement metric, a distance to move the range-extending computing device;
based on a determination that moving the range-extending computing device the distance will cause a backhaul signal quality, for communications via a backhaul wireless link between the range-extending computing device and the access point, to be below a threshold, adjusting the distance; and
sending a recommendation, based on the adjusted distance and based on the fronthaul signal quality improvement metric, that indicates a recommended movement of the range-extending computing device.

10. The method of claim 9, wherein the fronthaul signal quality data comprise one or more indications of received signal strength.

11. The method of claim 9, wherein the fronthaul signal quality data comprise data indicating, for a plurality of times, values for signal quality via the fronthaul wireless link.

12. The method of claim 9, further comprising:
determining, based on the fronthaul signal quality improvement metric, a score, wherein the sending the recommendation is based on determining that the score exceeds a threshold.

13. The method of claim 9, further comprising:
determining, based on the fronthaul signal quality improvement metric, a direction for the recommended movement of the range-extending computing device, wherein the recommendation comprises the direction.

14. The method of claim 9, wherein the recommendation comprises the adjusted distance.

15. The method of claim 9, wherein the receiving comprises receiving the fronthaul signal quality data via the access point and one or more additional range-extending computing devices between the range-extending computing device and the access point.

16. The method of claim 9, wherein the determining the distance comprises comparing the fronthaul signal quality improvement metric and a target fronthaul quality improvement metric.

17. A non-transitory computer-readable medium having instructions stored thereon that, when executed, cause:
receiving, from a range-extending computing device configured to wirelessly communicate between an access point and a client device, backhaul signal quality data for communications via a backhaul wireless link between the range-extending computing device and the access point;
predicting, based on the backhaul signal quality data, a backhaul signal quality improvement metric associated with a movement of the range-extending computing device;
determining, based on the backhaul signal quality improvement metric, a distance to move the range-extending computing device;
based on a determination that moving the range-extending computing device the distance will cause a fronthaul signal quality, for communications via a fronthaul wireless link between the range-extending computing device and the client device, to be below a threshold, adjusting the distance; and
sending a recommendation, based on the adjusted distance and based on the backhaul signal quality improvement metric, that indicates a recommended movement of the range-extending computing device.

18. The non-transitory computer-readable medium of claim 17, wherein the backhaul signal quality data comprise one or more indications of received signal strength.

19. The non-transitory computer-readable medium of claim 17, wherein the backhaul signal quality data comprise data indicating, for a plurality of times, values for signal quality via the backhaul wireless link.

20. The non-transitory computer-readable medium of claim 17, wherein the instructions, when executed, cause:
determining, based on the backhaul signal quality improvement, a score, wherein the sending the recommendation is based on determining that the score exceeds a threshold.

21. The non-transitory computer-readable medium of claim 17, wherein the instructions, when executed, cause:
determining, based on the backhaul signal quality improvement metric, a direction for the recommended movement of the range-extending computing device, wherein the recommendation comprises the direction.

22. The non-transitory computer-readable medium of claim 17, wherein the recommendation comprises the distance.

23. The non-transitory computer-readable medium of claim 17, wherein the instructions, when executed, cause the receiving by causing receiving the backhaul signal quality data via the access point and one or more additional range-extending computing devices between the range-extending computing device and the access point.

24. The non-transitory computer-readable medium of claim 17, wherein the instructions, when executed, cause the determining the distance by causing comparing the backhaul signal quality improvement metric and a target backhaul quality improvement metric.

25. A non-transitory computer-readable medium having instructions stored thereon that, when executed, cause:
- receiving, from a range-extending computing device configured to wirelessly communicate between an access point and a client device, fronthaul signal quality data for communications via a fronthaul wireless link between the range-extending computing device and the client device;
- predicting, based on the fronthaul signal quality data, a fronthaul signal quality improvement metric associated with a movement of the range-extending computing device;
- determining, based on the fronthaul signal quality improvement metric, a distance to move the range-extending computing device;
- based on a determination that moving the range-extending computing device the distance will cause a backhaul signal quality, for communications via a backhaul wireless link between the range-extending computing device and the access point, to be below a threshold, adjusting the distance; and
- sending a recommendation, based on the adjusted distance and based on the fronthaul signal quality improvement metric, that indicates a recommended movement of the range-extending computing device.

26. The non-transitory computer-readable medium of claim 25, wherein the fronthaul signal quality data comprise one or more indications of received signal strength.

27. The non-transitory computer-readable medium of claim 25, wherein the fronthaul signal quality data comprise data indicating, for a plurality of times, values for signal quality via the fronthaul wireless link.

28. The non-transitory computer-readable medium of claim 25, wherein the instructions, when executed, cause:
- determining, based on the fronthaul signal quality improvement metric, a score, wherein the sending the recommendation is based on determining that the score exceeds a threshold.

29. The non-transitory computer-readable medium of claim 25, wherein the instructions, when executed, cause:
- determining, based on the fronthaul signal quality improvement metric, a direction for the recommended movement of the range-extending computing device, wherein the recommendation comprises the direction.

30. The non-transitory computer-readable medium of claim 25, wherein the recommendation comprises the adjusted distance.

31. The non-transitory computer-readable medium of claim 25, wherein the instructions, when executed, cause the receiving by causing receiving the fronthaul signal quality data via the access point and one or more additional range-extending computing devices between the range-extending computing device and the access point.

32. The non-transitory computer-readable medium of claim 25, wherein the instructions, when executed, cause the determining the distance by causing comparing the fronthaul signal quality improvement metric and a target fronthaul quality improvement metric.

* * * * *